United States Patent
Bocchicchio et al.

[11] Patent Number: 6,113,158
[45] Date of Patent: Sep. 5, 2000

[54] PIPE JOINT COUPLING

[75] Inventors: Brian Bocchicchio, Fairview Park; Thomas Hawkins, Aurora; Brian Winslett, Euclid, all of Ohio

[73] Assignee: The Lamson & Sessions Co., Cleveland, Ohio

[21] Appl. No.: 09/082,750

[22] Filed: May 21, 1998

[51] Int. Cl.[7] .................................................. F16L 25/00
[52] U.S. Cl. ......................... 285/331; 285/921; 285/110
[58] Field of Search ................................... 285/921, 331, 285/110, 369, 148.6, 148.7, 148.9

[56] References Cited

U.S. PATENT DOCUMENTS

| | | | |
|---|---|---|---|
| Re. 33,199 | 4/1990 | Karr, Jr. . | |
| 52,010 | 1/1866 | Aldrich . | |
| 249,594 | 11/1881 | Dietz . | |
| 279,086 | 6/1883 | Emery . | |
| 795,976 | 8/1905 | Herrick . | |
| 1,540,504 | 6/1925 | Seaman . | |
| 1,940,074 | 12/1933 | Burmeister . | |
| 2,182,995 | 12/1939 | Pepper et al. . | |
| 2,517,290 | 8/1950 | De Moude et al. . | |
| 3,051,514 | 8/1962 | Consolloy | 285/369 X |
| 3,873,134 | 3/1975 | Sammaritano . | |
| 3,958,719 | 5/1976 | Ward | 285/921 X |
| 4,214,586 | 7/1980 | Mericle | 285/921 X |
| 4,313,286 | 2/1982 | Harbeke | 285/331 X |
| 4,400,019 | 8/1983 | Fruck . | |
| 4,452,462 | 6/1984 | Karr, Jr. . | |
| 4,679,827 | 7/1987 | Law | 285/921 X |
| 4,796,669 | 1/1989 | St. Onge . | |
| 5,267,757 | 12/1993 | Dal Palu | 285/921 X |
| 5,362,112 | 11/1994 | Hamilton et al. | 285/331 X |
| 5,507,504 | 4/1996 | Neumann et al. . | |
| 5,687,997 | 11/1997 | Beacom . | |
| 5,709,411 | 1/1998 | Bank et al. | 285/331 X |
| 5,730,474 | 3/1998 | Bank . | |

*Primary Examiner*—Lynne H. Browne
*Assistant Examiner*—David E. Bochna
*Attorney, Agent, or Firm*—Jones, Day, Reavis & Pogue

[57] ABSTRACT

A joint coupling is disclosed for connecting sections of conduit. The present joint coupling includes a male connector portion having an inner side and an outer side, having a barb on one or both of the sides. A gasket is received on the male connector portion, and has one or more fins on the side opposite the barb. A female connector portion receives and engages the male connector portion and includes a first side having a lock down lip for engaging the barb and a second side for contacting the gasket fins. The fins bias the connector portions in an interference to create a transverse locking force that securely retains the connector portions. The connector portions can be formed directly on the sections of conduit, or can be formed on a discrete conduit cap or an intermediate coupler, for joining sections of conduit.

14 Claims, 5 Drawing Sheets

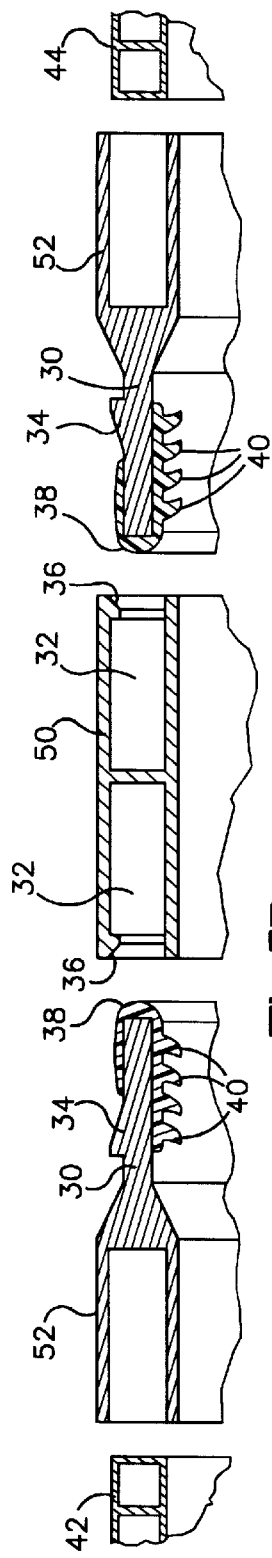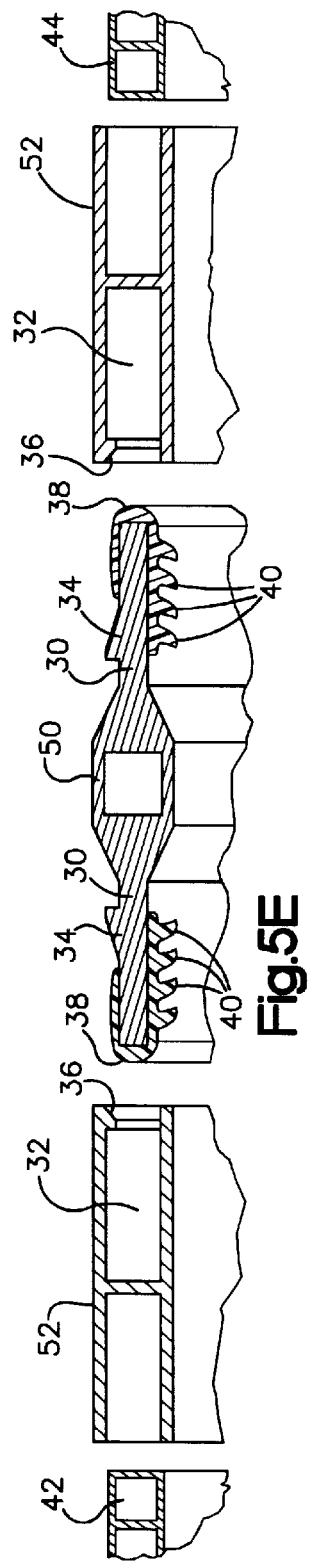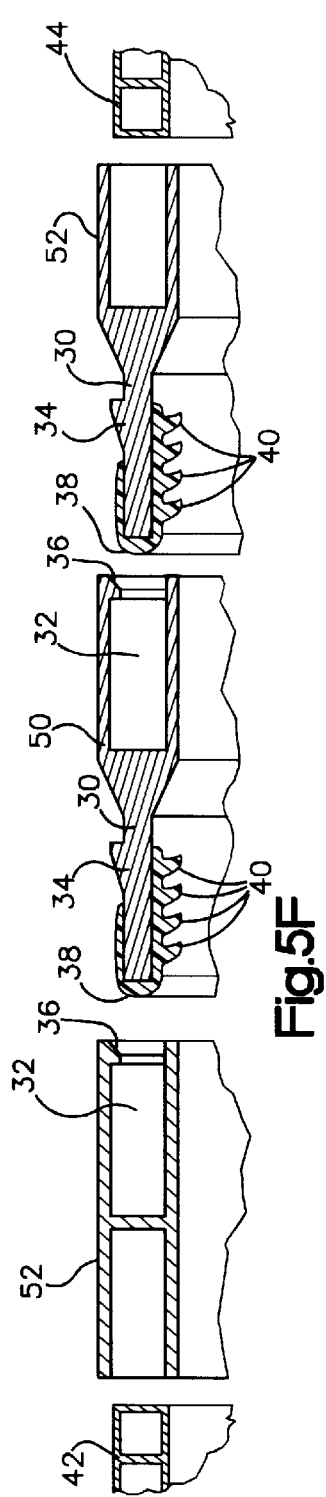

PIPE JOINT COUPLING

The present invention pertains to the field of joint couplers, particularly those of the type used to join two sections of conduit. The present invention has particular applicability as used with slipliner applications where conduit sections are retrofitted into existing pipe for relining. A previous pipe joint coupling design is shown in FIGS. 1A and 1B which corresponds to the device shown in U.S. Pat. No. 5,362,112. This previous joint design includes a pair of annular pipe sections 12, 14 that each have channels 16, 18 formed along the perimeter of the pipe end. A coupling member 20 includes a solid core 22, annular in shape, around which fits a resilient gasket 24 having a plurality of fins 26 that create a fluid-tight seal within the interior of the channels 14.

During slipliner installation, conduit sections are coupled and pushed into existing pipe. However, for certain applications, high forces are required for pipe installation, resulting in excessive loads that can create difficulties during installation.

SUMMARY OF THE INVENTION

In view of certain difficulties and drawbacks associated with previous joint coupler designs, there is therefore a need for a joint coupler with improved joint strength and functionality.

There is also a need for a joint coupler with improved locking characteristics.

There is also a need for a joint coupler that provides improved ease of assembly and installation.

These needs and others are satisfied by the present invention in which a joint coupling is provided for connecting sections of conduit. The present joint coupling includes a male connector portion having an inner side and an outer side, having a barb on one of the sides. A gasket is received on the male connector portion, and has one or more fins on the side opposite the barb. A female connector portion receives and engages the male connector portion and includes a first side having a lock down lip for engaging the barb and a second side for contacting the gasket fins. The fins bias the connector portions in an interference to create a transverse locking force that securely retains the connector portions. The connector portions can be formed directly on the sections of conduit, or can be formed on a discrete conduit cap or an intermediate coupler, for joining sections of conduit.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

FIGS. 5A, 5B, 5C, 5D, 5E and 5F show various embodiments of the present joint coupling including a conduit cap.

DETAILED DESCRIPTION OF THE INVENTION

Figure 1A:
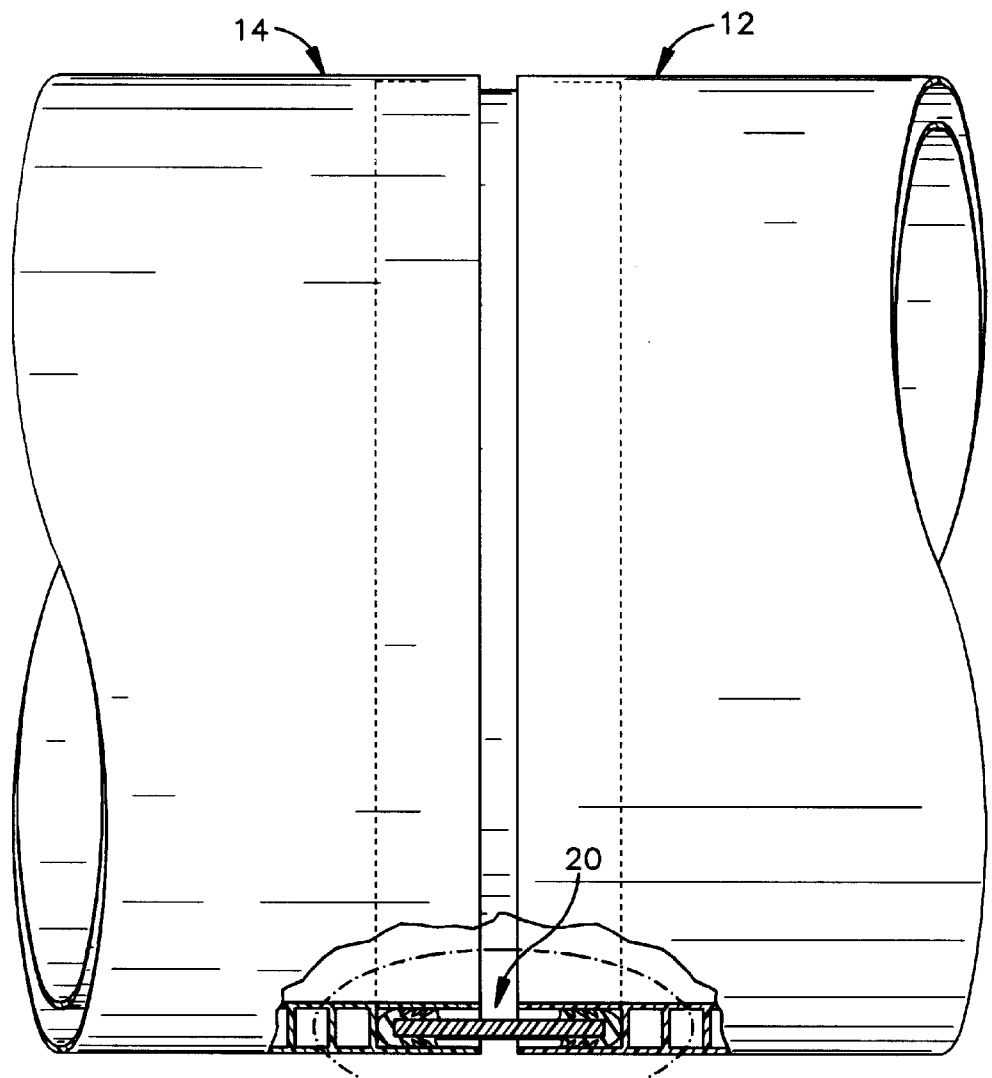
FIGS. 1A and 1B show a previous joint coupling design.
Figure 1B:
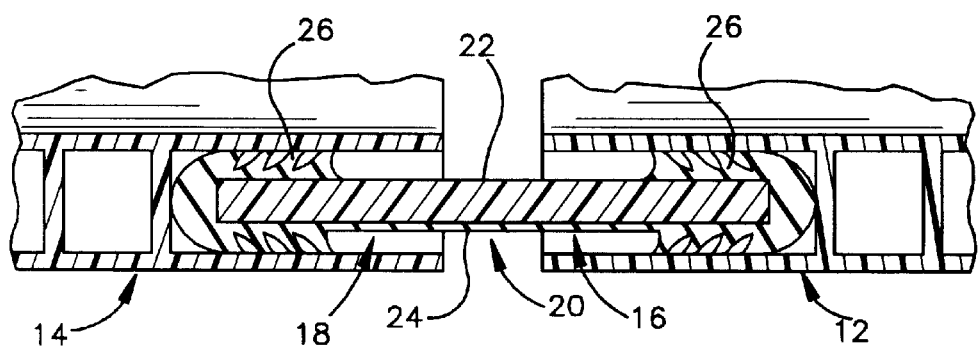
Figure 2A:
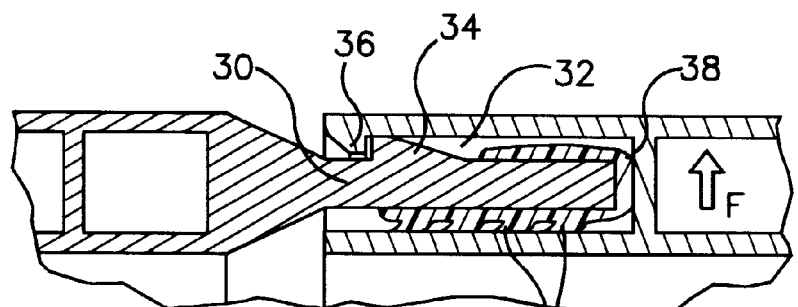
FIGS. 2A and 2B show first and second embodiments of the joint coupling of the present invention.

FIG. 2A shows the joint coupling as according to the present invention, including a male connector portion 30 and a female connector portion 32, which receives and engages the male connector portion 30. These connector portions 30, 32 are preferably generally annular so as to join the wall ends of hollow cylindrical conduit sections. The connector profile elements depicted herein are preferably figures of revolution. The figures shown herein are sectional views showing a cross-section of the annular connector portions 30, 32 and conduit sections.

The annular male connector portion 30 has an inner side and an outer side, and a barb 34 is formed on one of the sides. The female connector portion 32 defines a cavity including first and second interior sides, one of which includes a lock down lip 36 that engages the barb 34. It will be understood that the barb 34 and the lock down lip 36 can be formed on either side of the respective connector portions 30, 32 as long as they are in engagement positions, to permit locking of the respective conduit sections. A gasket 38 is received on the male connector portion 30, and has at least one fin 40, preferably a plurality of fins 40, supported on the side opposite of the barb 34. The fins 40 are configured to contact the interior side opposite the lock down lip 36. The gasket 38 with fins 40 is preferably formed of a resilient material such as rubber or a thermoplastic elastomer. When the coupling is assembled, the fins 40 are compressed into the interior cavity and pressed against the side, biasing the fins 40 in a snug interference fit, establishing a transverse locking force between the male and female connector portions 30, 32 that securely connects them, providing excellent sealing and a strong joint.

Figure 2B:
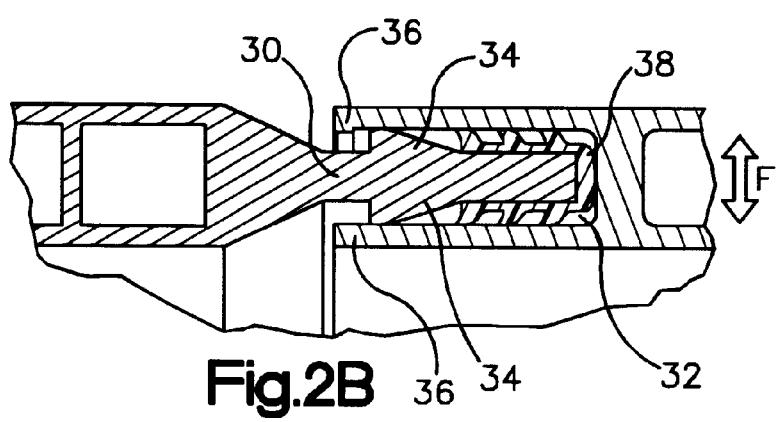

In the embodiment of FIG. 2A, the gasket 38 is a "J-type" gasket that loops over the end of the male connector portion 30. FIG. 2B shows an alternative embodiment in which the gasket 38 is a "U-type" gasket having fins 40 on both sides of the male connector portion 30. It may also be advantageous to form barbs 34 on both sides with respective lock down lips 36 formed on both interior sides of the female connector portion 32. This will apply the locking feature to both sides, providing additional securement.

Figure 3:
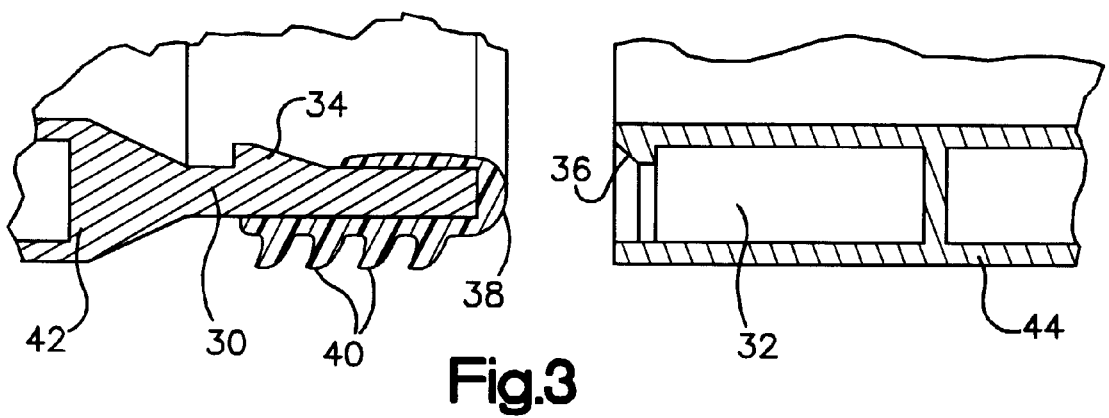
FIG. 3 shows the present joint coupling formed on respective ends of conduit.
Figure 4A:
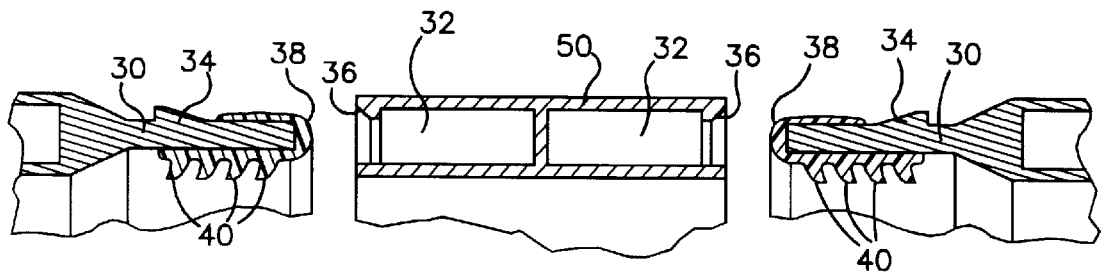
FIGS. 4A, 4B and 4C show various embodiments of the present joint coupling using a coupler member.
Figure 4B:
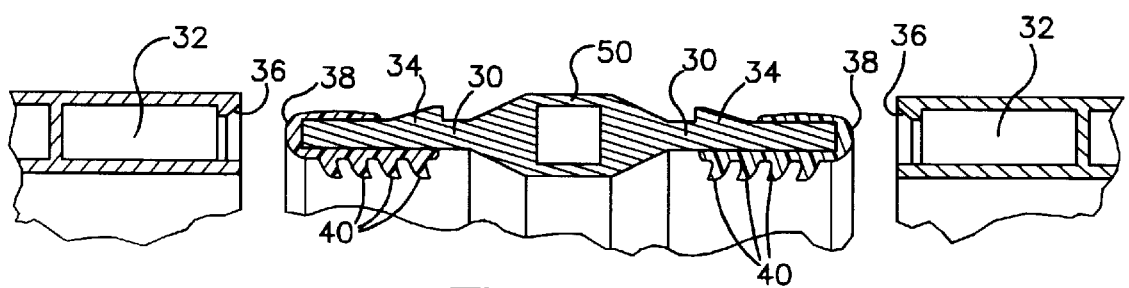
Figure 4C:
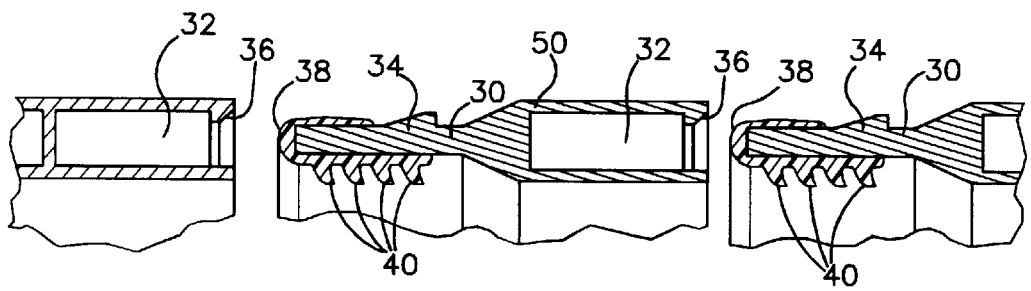

In the embodiment shown in FIG. 3, the male and female connector portions 30, 32 can be formed directly on the ends of the walls of conduit sections 42, 44, so that the conduit sections 42, 44 can be directly coupled together. As shown in FIGS. 4A, 4B and 4C, it may be advantageous to use an intermediate coupler 50 having first and second coupler connector portions, that engage with mating connector portions formed directly on the conduit sections 42, 43.

FIG. 4A shows a coupler 50 having a pair of female connector portions 32 that mate with male connector portions 30 formed directly on the conduit sections 42, 44. FIG. 4B shows a coupler 50 having a pair of male connecting portions 30 that mate with respective female connector portions 32 formed directly on the conduit sections 42, 44, FIG. 4C shows a coupler 50 having both a male connector portion 30 and a female connector portion 32 that mate with respective female and male portions 32, 30 formed on the conduit sections 42, 44.

As a further aspect of the invention as shown in FIGS. 5A–5F, connector portions 30, 32 can be formed directly onto a conduit cap 52 having a cavity 54 which is affixed to the end at a conduit 42, 44 using glue, heat welding or other means known in the art. The ends of the conduit 42, 44 can be channeled along the edges so as to permit the cap 52 to be flush with the inner and outer walls of the conduit 42, 44. However, the ends of the conduit 42, 44 can also be left normal thickness, so that the caps 52 have an oversized diameter from that of the conduit 42, 44.

Figure 5A:
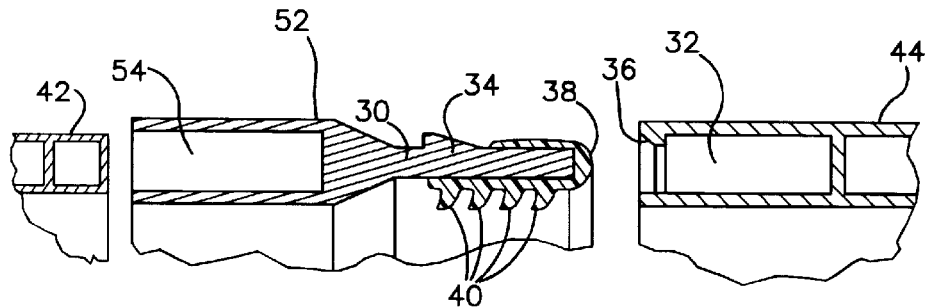
Figure 5B:
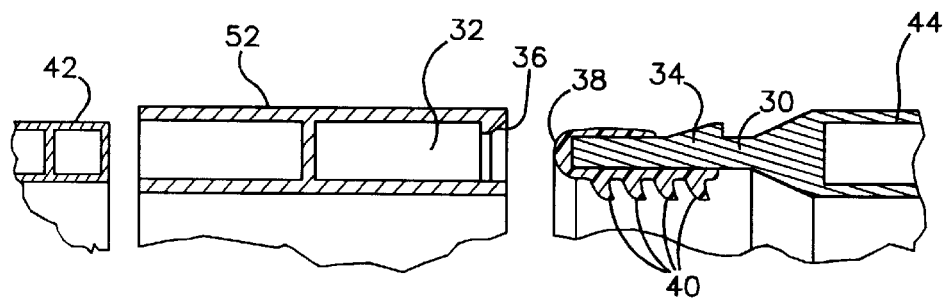
Figure 5C:
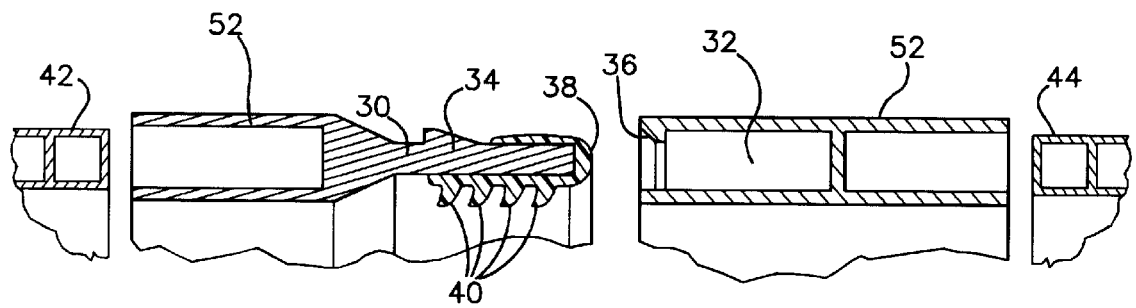

FIG. 5A shows a cap 52 that attaches to a conduit 42. The cap has a male connector portion 30 that is received into a female connector portion 32 formed directly onto the end at a conduit 44. FIG. 5B shows a similar configuration with a female connector portion 32 formed on the cap 52 with a male connector portion 32 formed directly on the conduit 44. FIG. 5C shows a pair of caps 52, having respective male and female connector portions 30, 32 that attach to the unformed ends of the conduit sections 42, 44. FIGS. 5D, 5E and 5F utilize a coupler 50 and correspond respectively in structure to FIGS. 4A, 4B and 4C, except in that the conduit sections 42, 44 use caps 52 having the respective connector portions rather than having the connector portions formed directly thereon.

It should be understood that, even though the figures show only a single barb 34 and lock down lip 36, the couplings shown in the figures can also employ a double-barb/lock down lip structure with "U-type" gasket, as shown in FIG. 2B, without departing from the invention. The connector of the present invention also has excellent sealing properties.

As described hereinabove, the present invention presents many improvements in efficiency and operability. However, it will be appreciated that various changes in the details, materials and arrangements of parts which have been herein described and illustrated in order to explain the nature of the invention may be made by those skilled in the art within the principle and scope of the invention as expressed by the appended claims.

We claim:

1. A joint coupling connecting sections of conduit, comprising:

a male connector portion having an inner side and an outer side, and a barb on one of said sides;

a sealing member, received on said male connector portion, having at least one sealing surface on the other of said sides;

a female connector portion for receiving and engaging said male connector portion, wherein said female connector portion includes:
 a first side having at least one lock down lip for engaging with said at least one barb;
 a second side for contacting said at least one sealing surface and biasing said at least one sealing surface in an interference fit, so as to establish a transverse locking force between said male and female connector portions;

wherein at least one of said male and female connector portions are conjoined to at least one section of conduit;

a coupler having first and second coupler connector portions for engaging first and second conduit connector portions secured to first and second sections of conduit; and at least one of said first and second conduit connector portions being formed integrally onto a conduit cap, which is affixed to the respective section of conduit.

2. The joint coupling of claim 1 wherein the first and second coupler connector portions are female connector portions and wherein said first and second conduit connector portions are male connector portions.

3. The joint coupling of claim 1 wherein the first and second coupler connector portions are male connector portions and wherein said first and second conduit connector portions are female connector portions.

4. The joint coupling of claim 1 wherein one of said first and second coupler connector portions is a male connector portion and the respective other coupler connector portion is a female connector portion, wherein one of said first and second conduit connector portions is a male connector portion and the respective other conduit connector portion is a female connector portion.

5. An apparatus comprising:

first and second conduits having a common uniform outer diameter;

an annular coupler separate from said conduits, said coupler having an installed position joining said conduits; and a pair of annular sealing members;

said conduits and said coupler together defining a pair of female joint structures and a pair of male joint structures having installed positions within said female joint structures, each of said male joint structures having a radially projecting barb and each of said female joint structures having a retaining lip configured to interlock with one of said barbs upon movement of a corresponding one of said male joint structures to its installed position;

each of said sealing members being mounted on and carried by a corresponding one of said male joint structures and being compressible within the corresponding female joint structure radially opposite a barb;

said coupler and said joint structures having greatest outer diameters that are not greater than said uniform outer diameter.

6. An apparatus comprising:

first and second conduits;

an annular sealing member;

an annular conduit cap having an installed position engaging said first conduit; and an annular coupler having an installed position interposed between said second conduit and said conduit cap;

said conduit cap and said annular coupler together defining a male joint structure having a radially projecting barb and a female joint structure having a retaining lip configured to interlock with said barb upon movement of said male joint structure to an installed position within said female joint structure;

said sealing member being mounted on and carried by said male joint structure and being compressible within said female joint structure radially opposite said barb.

7. Apparatus as defined in claim 6 wherein said conduit cap has an end portion configured as said male joint structure and said annular coupler has axially opposite end portions each said end portion configured as said female joint structure.

8. Apparatus as defined in claim 6 wherein said conduit cap has an end portion configured as said female joint structure and said annular coupler has axially opposite end portions each said end portion configured as said male joint structure.

9. Apparatus as defined in claim 6 wherein said conduit cap has an end portion configured as said male joint structure and said annular coupler has first and second axially opposite end portions, said first end portion of said annular coupler being configured as said male joint structure and said second end portion of said annular coupler being configured as said female joint structure.

10. Apparatus as defined in claim 6 wherein said conduit cap has an end portion configured as said female joint structure and said annular coupler has first and second axially opposite end portions, said first end portion of said annular coupler being configured as said male joint structure and said second end portion of said annular coupler being configured as said female joint structure.

11. An apparatus comprising:

first and second conduits;

an annular sealing member;

first and second annular conduit caps having installed positions respectively engaging said first and second conduits; and an annular coupler having an installed position interposed between said first and second conduit caps;

said conduit caps and said annular coupler together defining a male joint structure having a radially projecting barb and a female joint structure having a retaining lip configured to interlock with said barb upon movement of said male joint structure to an installed position within said female joint structure;

said sealing members being mounted on and carried by said male joint structure and being compressible within said female joint structure radially opposite said barb.

12. Apparatus as defined in claim 11 wherein said annular coupler has axially opposite end portions configured as said male joint structures and said first and second conduit caps each has an end portion configured as said female joint structure.

13. Apparatus as defined in claim 11 wherein said annular coupler has axially opposite end portions configured as said female joint structures and said first and second conduit caps each has an end portion configured as said male joint structure.

14. Apparatus as defined in claim 11 wherein said annular coupler has first and second axially opposite end portions said first end portion of said annular coupler being configured as said female joint structure, said second end portion of said annular coupler being configured as said male joint structure and said first and second conduit caps each has an end portion, said end portion of said first conduit cap being configured as said female joint structure, and said end portion of said second conduit cap being configured as said male joint structure.

* * * * *